US008089657B2

(12) United States Patent
Matsuo

(10) Patent No.: US 8,089,657 B2
(45) Date of Patent: Jan. 3, 2012

(54) DEVICE, PROGRAM AND METHOD FOR CALIBRATION OF AN IMAGE PRESENTING SYSTEM

(75) Inventor: Masaru Matsuo, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 641 days.

(21) Appl. No.: 12/260,513

(22) Filed: Oct. 29, 2008

(65) Prior Publication Data

US 2009/0150104 A1 Jun. 11, 2009

(30) Foreign Application Priority Data

Dec. 6, 2007 (JP) ................................ 2007-316454

(51) Int. Cl.
*G06F 15/00* (2006.01)
*G01D 18/00* (2006.01)

(52) U.S. Cl. ............................ 358/1.9; 702/85; 702/104

(58) Field of Classification Search ........................ None
See application file for complete search history.

(56) References Cited

U.S. PATENT DOCUMENTS

2002/0029715 A1* 3/2002 Ogatsu et al. ................ 101/494
2003/0125892 A1* 7/2003 Edge ............................ 702/107
2007/0058181 A1* 3/2007 Hatori ........................... 358/1.9

FOREIGN PATENT DOCUMENTS

JP 2000-184217 6/2000

* cited by examiner

*Primary Examiner* — Jonathan C Teixeira Moffat
(74) *Attorney, Agent, or Firm* — K&L Gates LLP

(57) ABSTRACT

A calibration device comprises a relative-value correction unit that performs a normalization for the measured output value based on a possible range of a measured output value and a normalization for a desired output value corresponding to the measured output value based on a range of the desired output value, an absolute-value correction unit that performs a normalization for the measured output value and the desired output value based on the range of the desired output value, a relative-value calibration unit that calibrates the measured output value normalized by the relative-value correction unit with reference to a characteristic of the desired output value normalized by the relative-value correction unit, and an absolute-value calibration unit that calibrates the measured output value normalized by the absolute-value correction unit with reference to the desired output value normalized by the absolute-value correction unit.

12 Claims, 10 Drawing Sheets

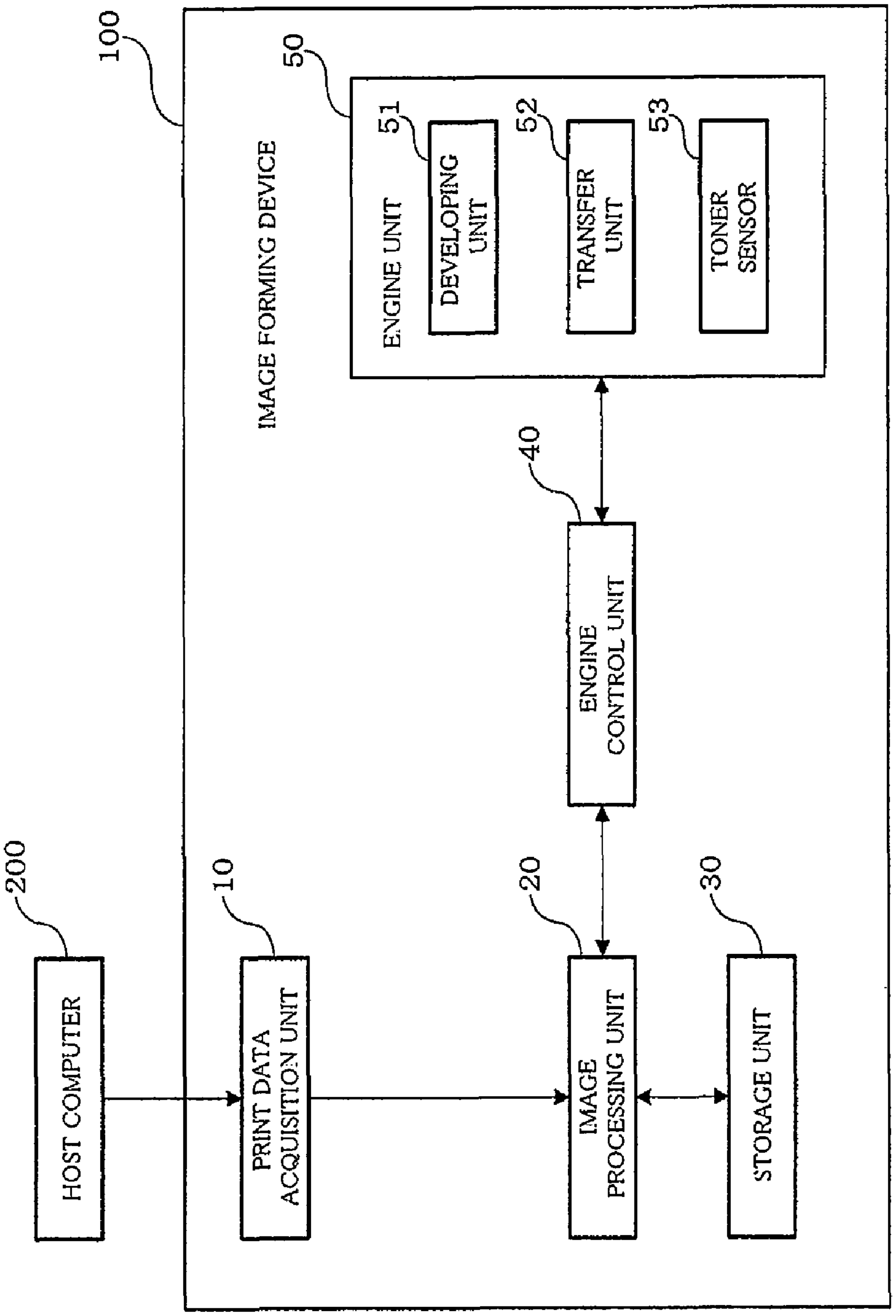
[Fig. 1]

【Fig.2】
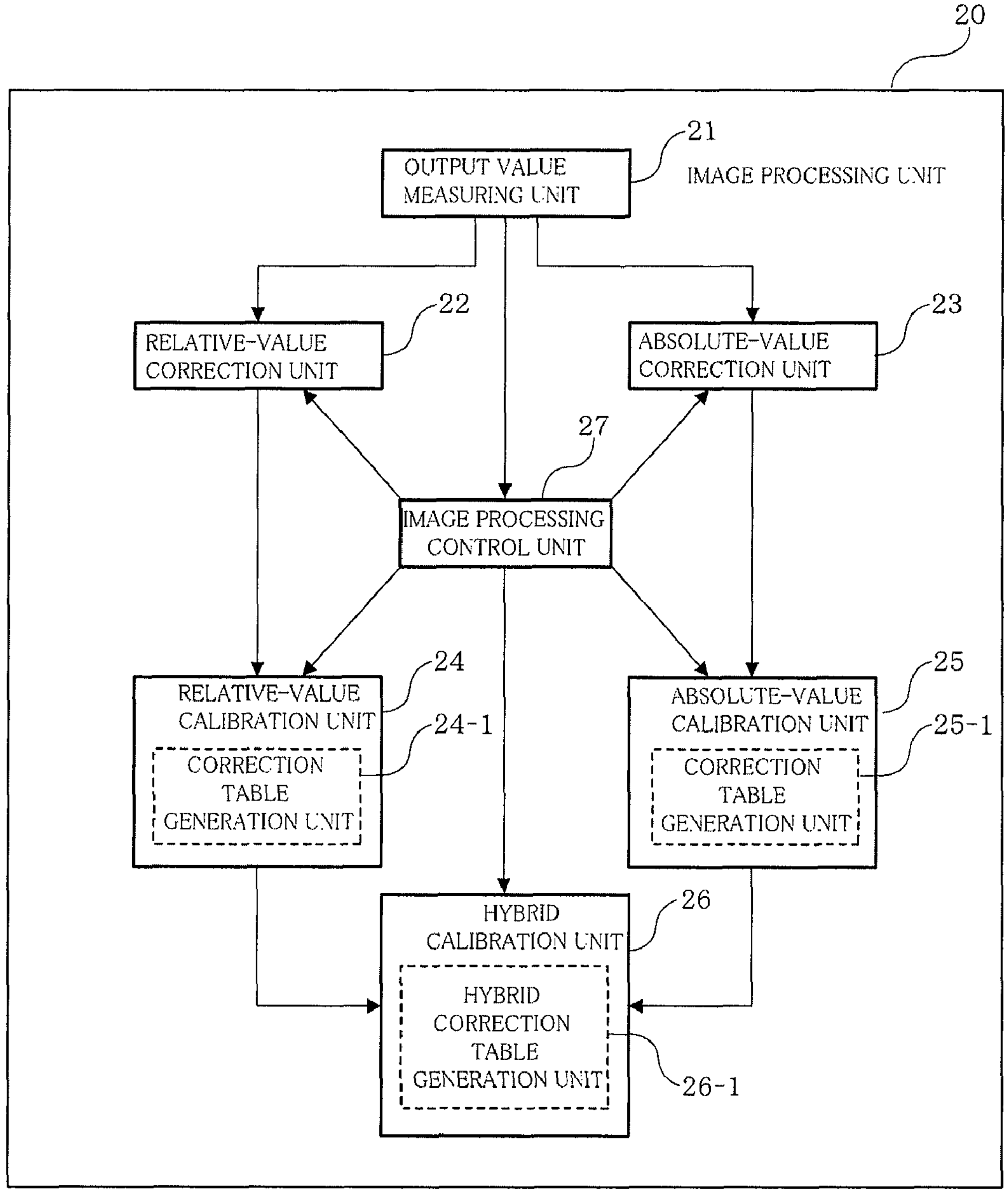

【Fig.3】
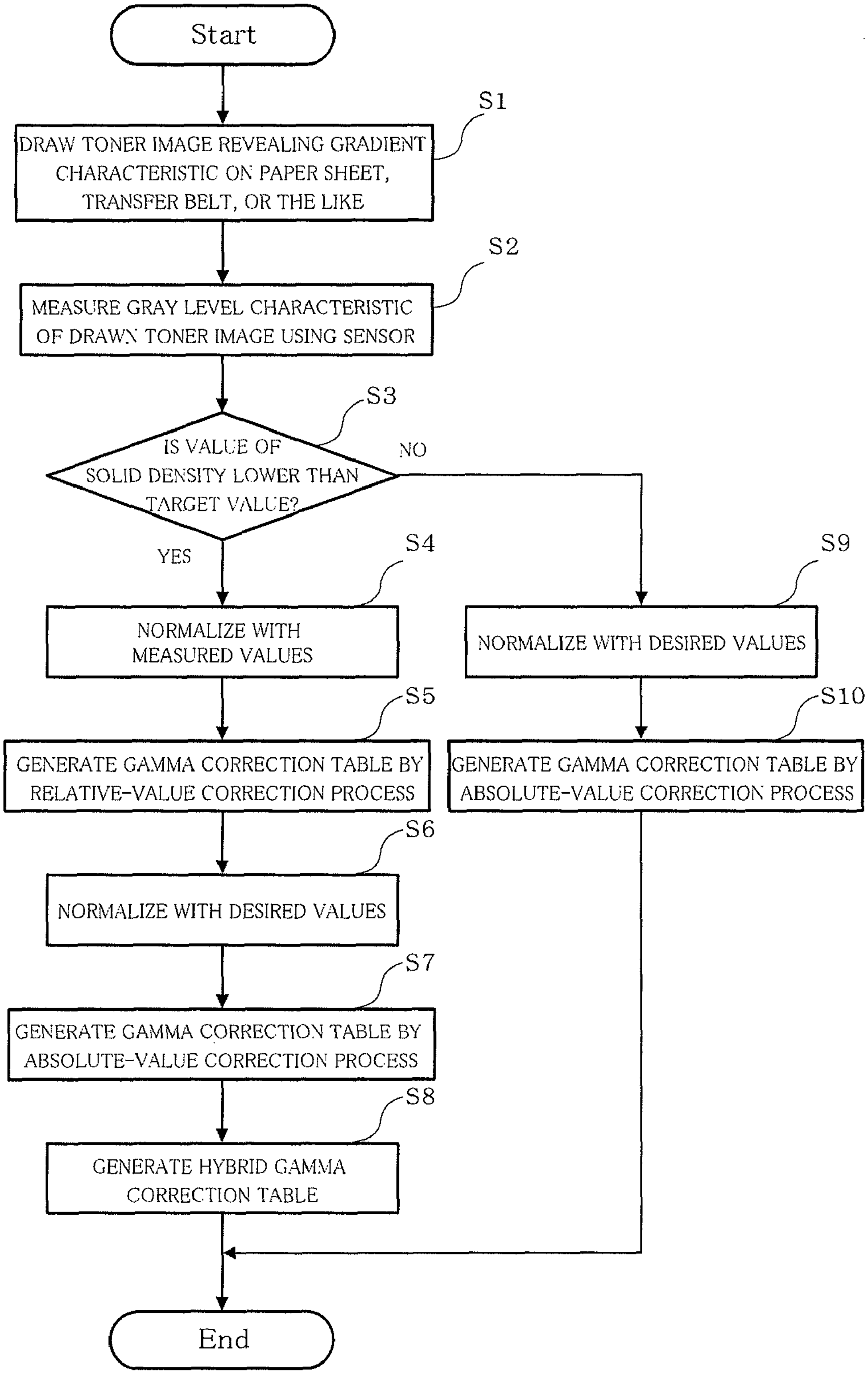

【Fig.4】
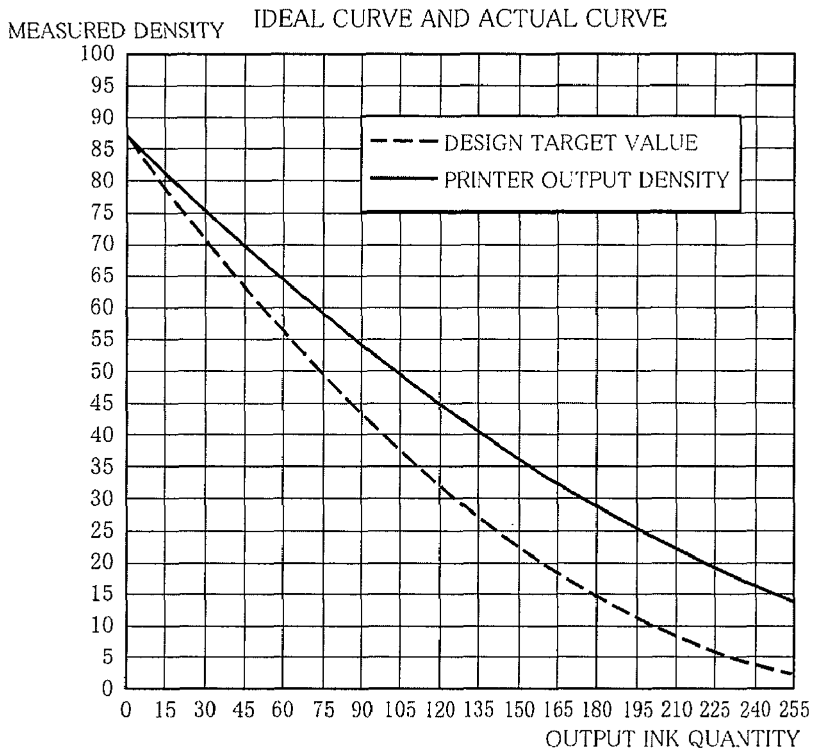
【Fig.5】
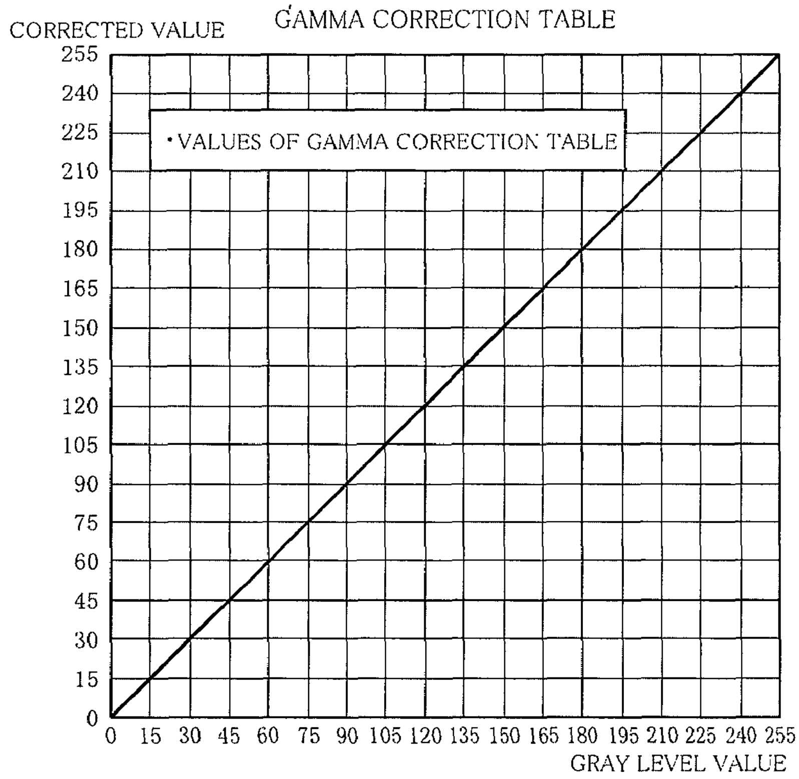

【Fig.6】
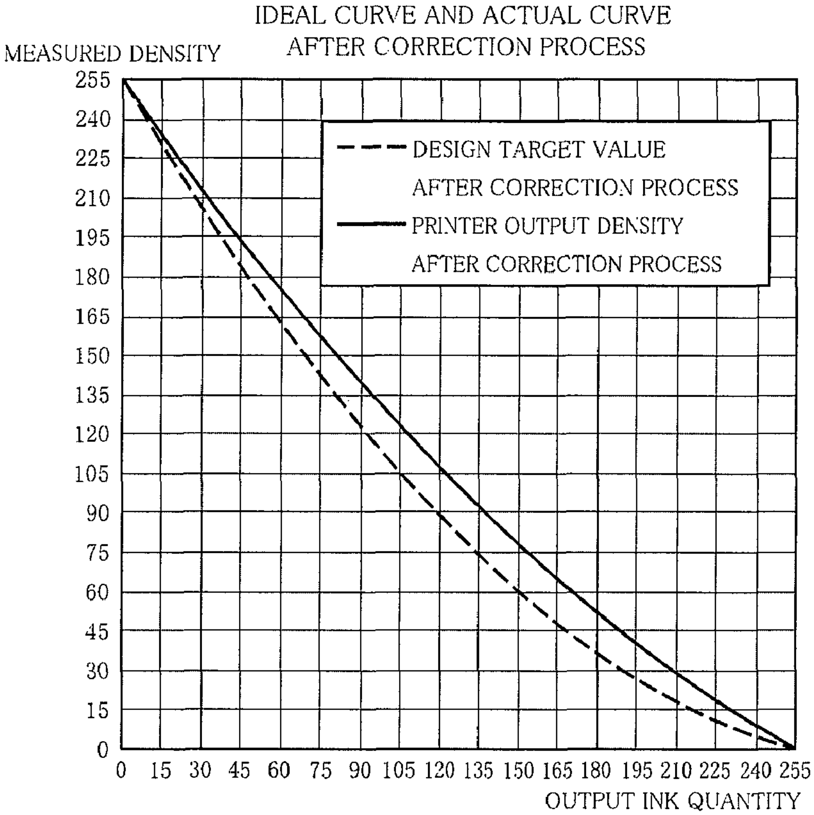
【Fig.7】
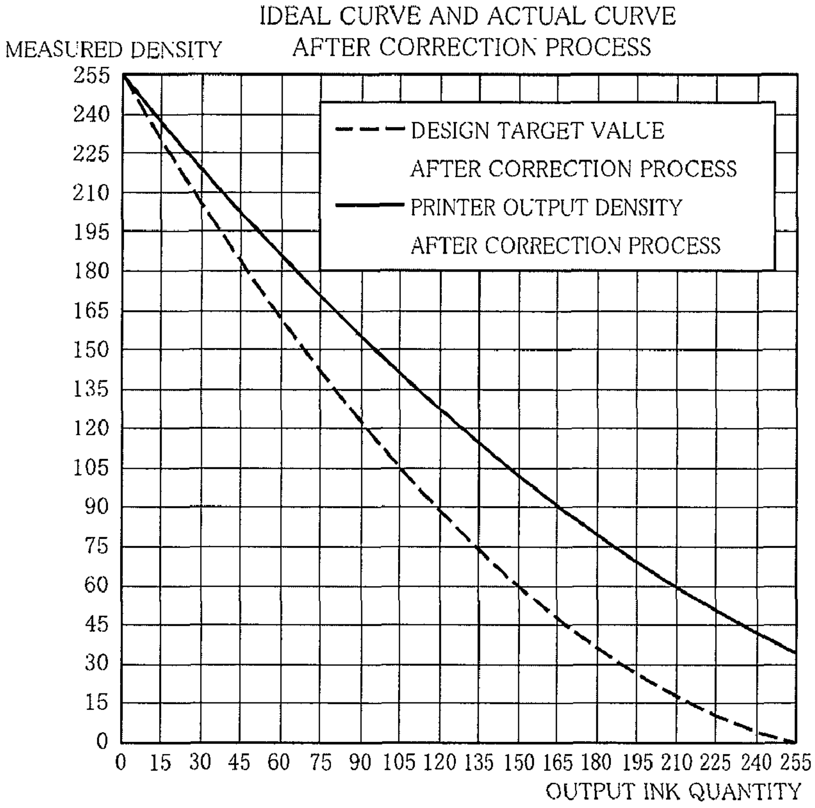

【Fig.8】
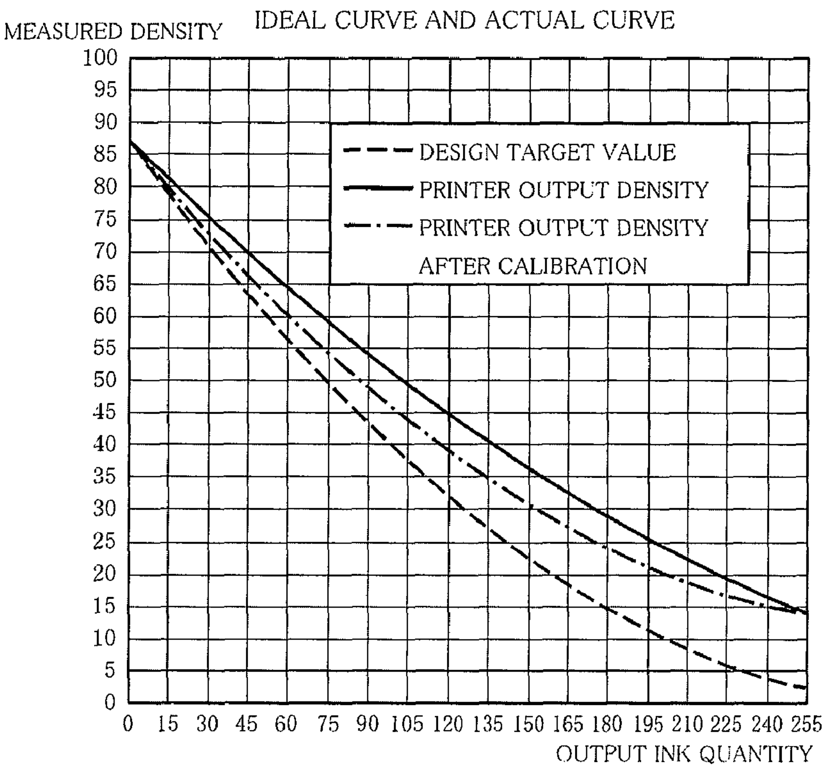
【Fig.9】
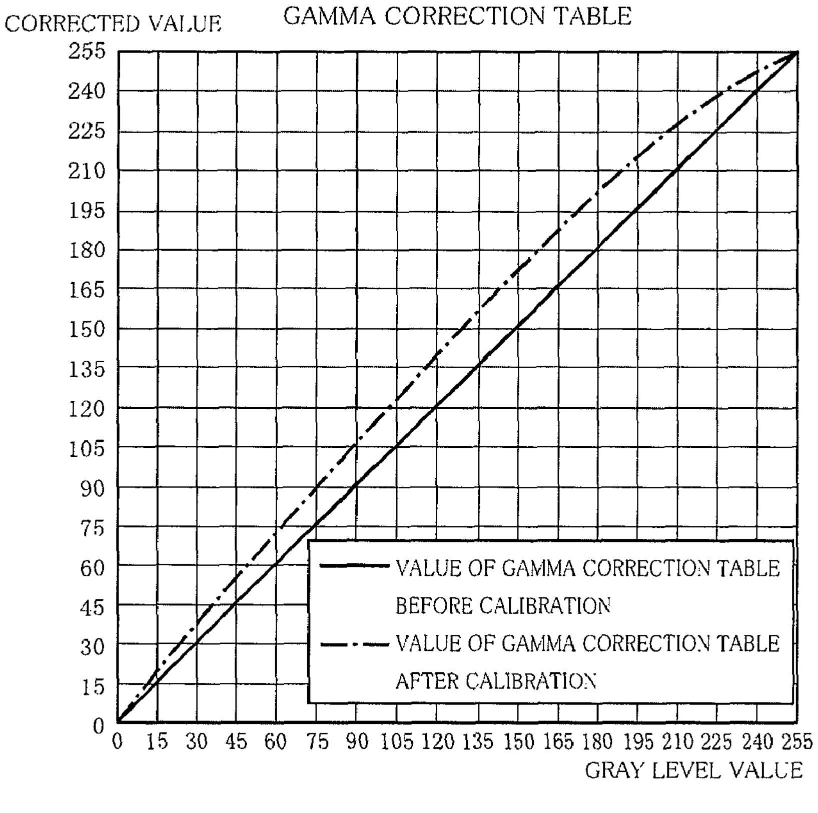

【Fig.10】
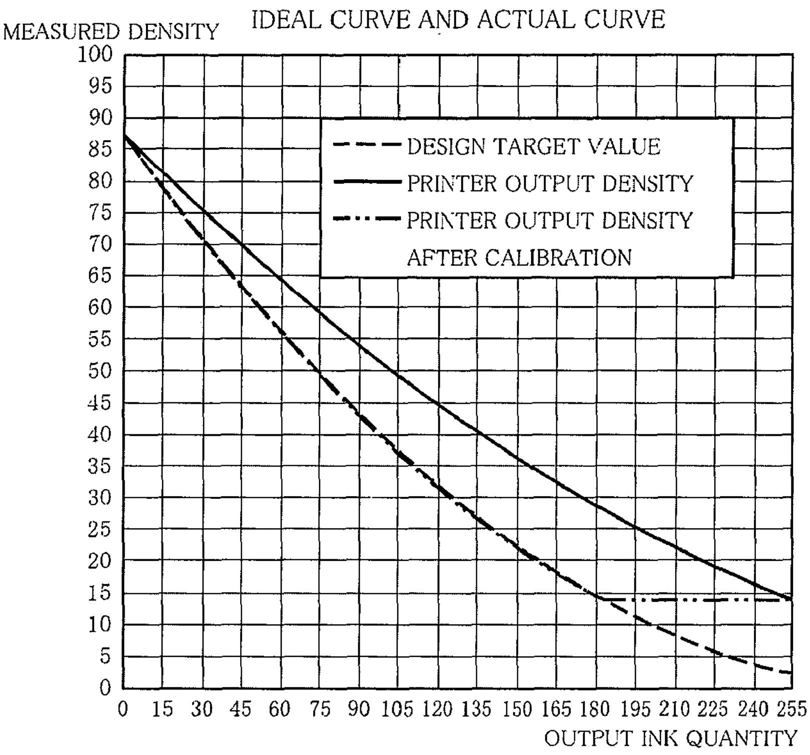
【Fig.11】
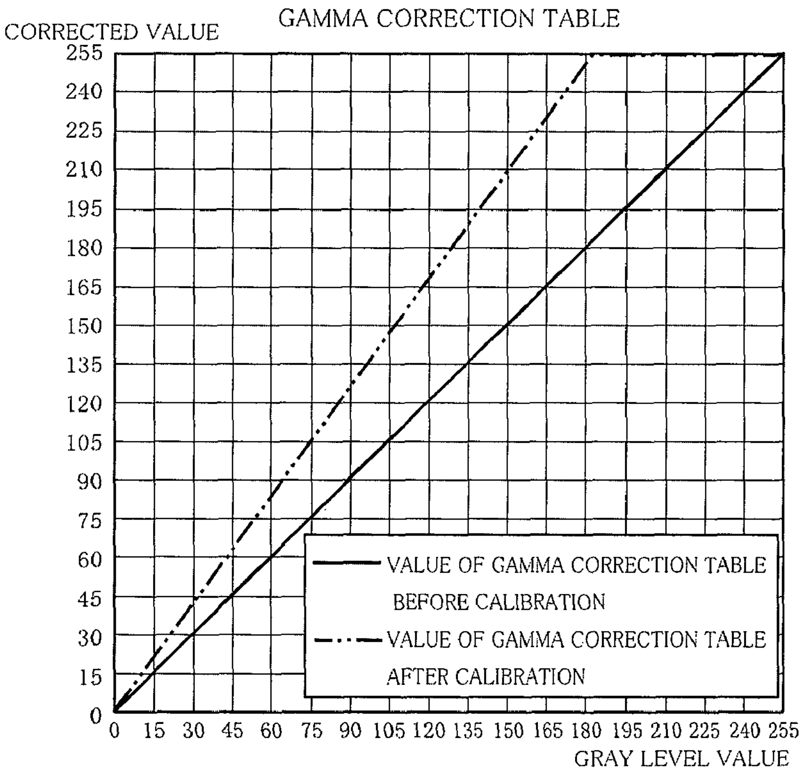

【Fig.12】
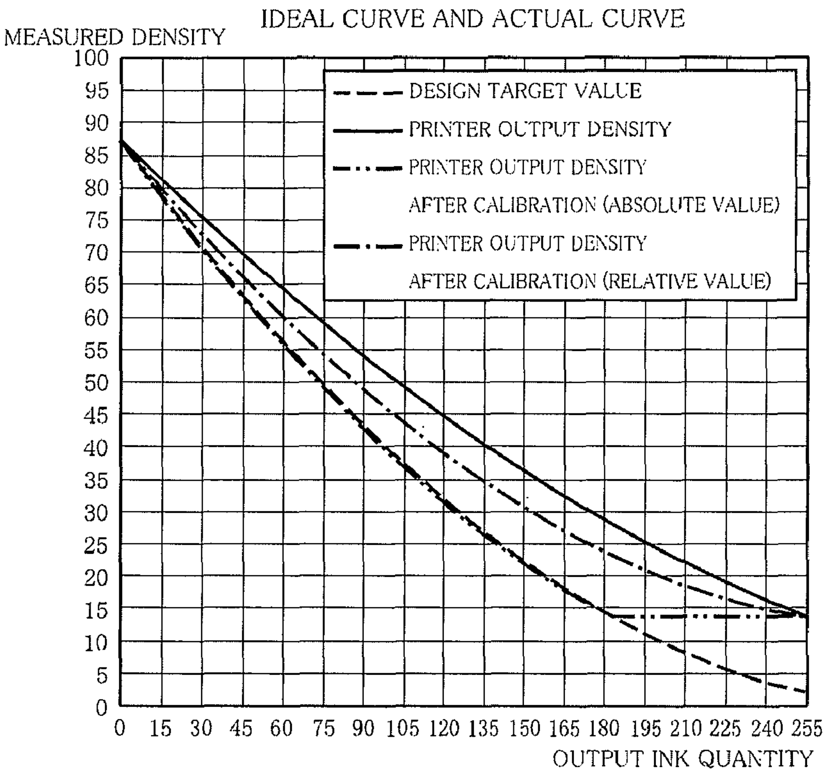
【Fig.13】
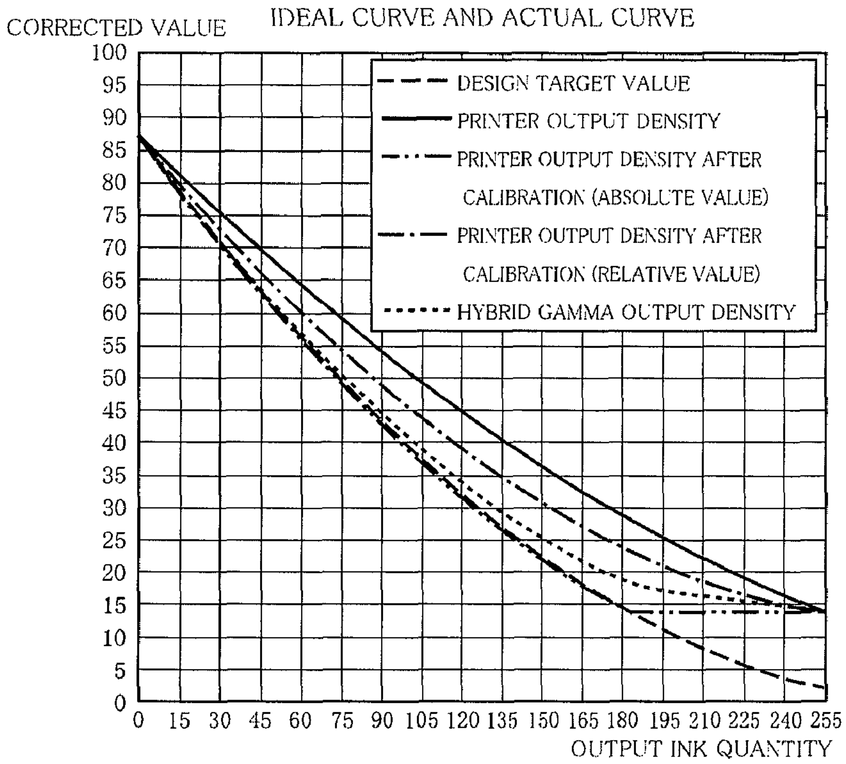

【Fig.14】
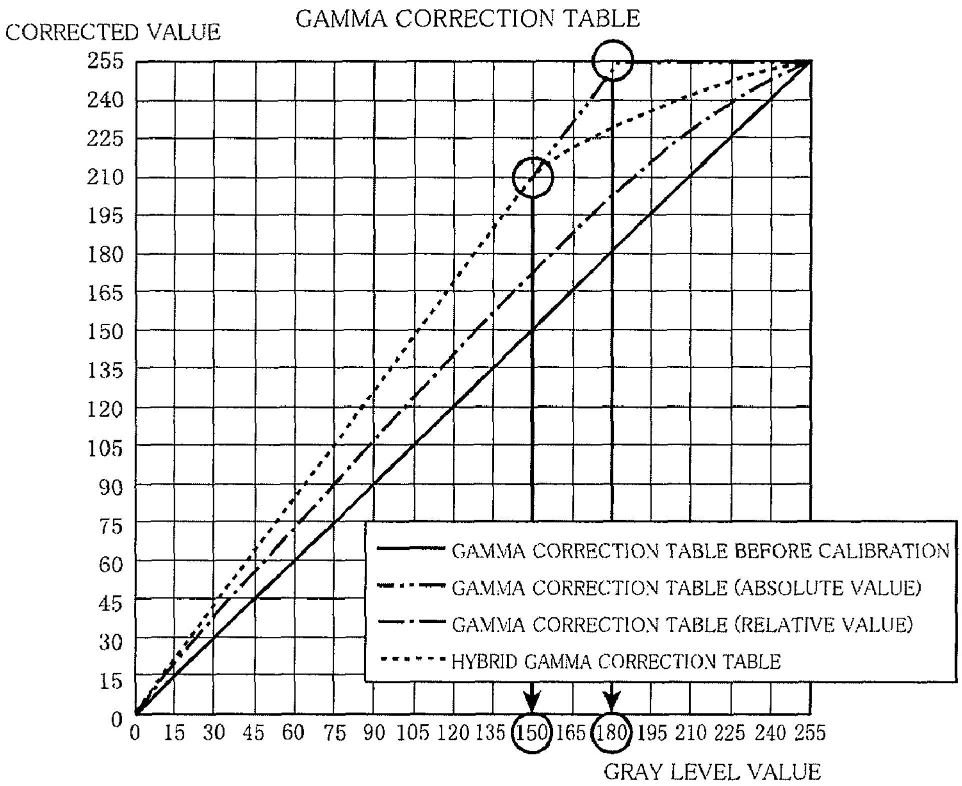

【Fig.15】
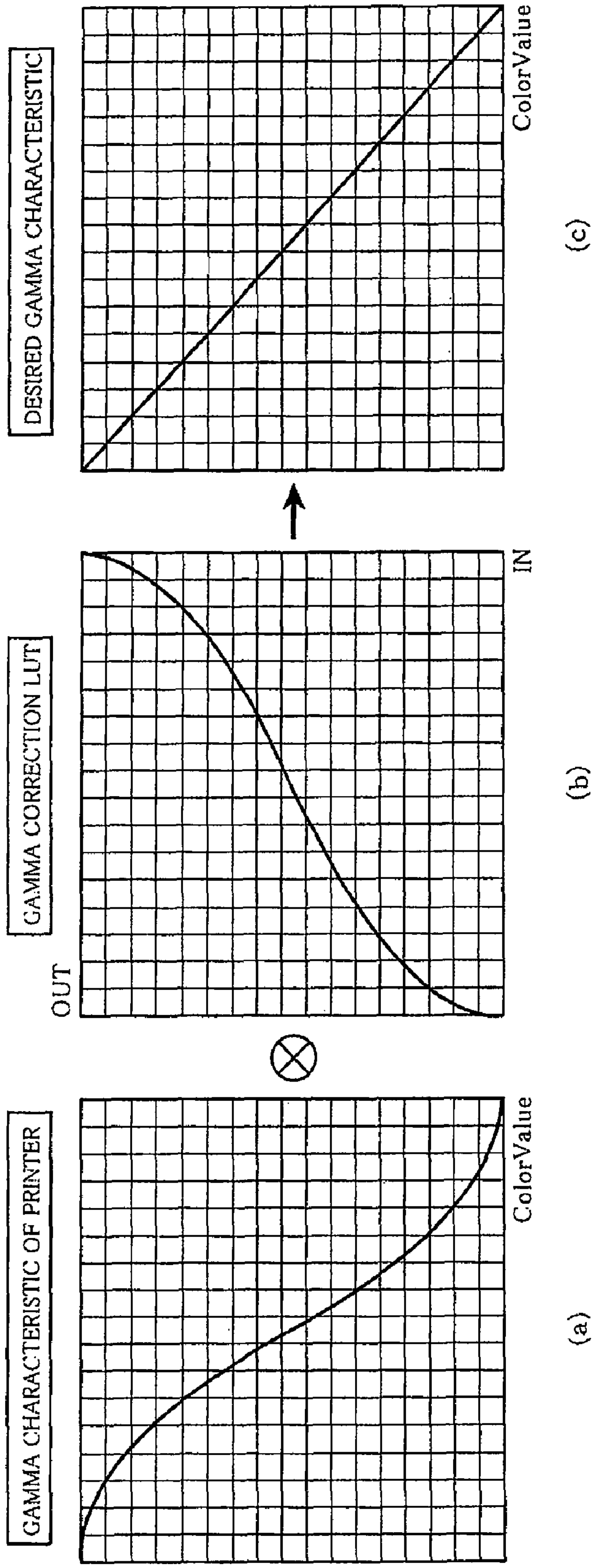
Prior Art

DEVICE, PROGRAM AND METHOD FOR CALIBRATION OF AN IMAGE PRESENTING SYSTEM

INCORPORATION BY REFERENCE

This application is based upon and claims the benefit of priority from the corresponding Japanese Patent Application No. 2007-316454, filed Dec. 6, 2007, the entire contents of which is incorporated herein by reference.

BACKGROUND

1. Field of the Invention

The present invention relates to calibration devices, methods, and computer-readable recording medium for storing calibration programs, which, in an image input/output process, obtain and store a desired input/output characteristic.

2. Description of Art

Conventionally, an image forming device, such as a printer, generates a predetermined image signal through an image process based on print data that is inputted, and adjusts the toner density based on the image signal. This results in a printed image having proper gray levels. In this type of forming device, in order to make the image signal coincide with the toner density actually printed, a correction of a so-called gamma characteristic (density/gray level characteristic) is generally performed.

FIGS. 15A to 15C illustrate a principle of the gamma correction process. As shown in FIG. 15C, although the gamma characteristic appears ideal when configured such that a change in the output is linear with respect to a change in the input when perceived by a person (the output changes with respect to the input as a designer intended), in reality, the gamma characteristic varies depending on the respective devices. Accordingly, it is therefore difficult to provide an ideal gamma characteristic.

In order to address this problem, in the image forming device, a gamma correction table or curve is provided (see FIG. 15B). This table corrects the unique gamma characteristic of the device at an initial setting when the device is manufactured, see FIG. 15A, thereby providing the ideal gamma characteristic.

When the gamma characteristic of the image forming device and the desired gamma characteristic are provided, the gamma correction table is obtained by an inverse operation from those gamma characteristics.

However, due to a change over time caused by long term operation or the like, the density of the toner may deviate from the gamma characteristic that is initially set. Therefore, it is necessary in conventional image forming devices, to correct the gamma characteristic periodically, or over a pre-set time period where the deviation of the gamma characteristic exceeds a threshold, so the actual toner density is properly set.

Typically, a calibration process is used, wherein the toner is attached to the photosensitive member according to some gray levels, and the densities of the attached toner are measured by a sensor. The gamma correction table is then calibrated based on the measurements obtained from the sensor so that the actual gamma characteristic approaches the ideal gamma characteristic.

For example, when an actual maximum density value which the device can output exceeds a predetermined maximum density value, a calibration is performed causing the density value to smoothly and monotonically increase to the actual maximum density value. On the other hand, when the actual maximum density value that can be output by the device does not reach the predetermined maximum density value, a calibration is performed so that the maximum density value is in a range from an input value which first causes the device to output the maximum density value to the maximum input value.

SUMMARY

Pursuant to the present invention, calibration devices, calibration methods, and computer-readable recording medium that stores calibration programs, are provided which can efficiently compensate for a reduction in image quality that can occur over time. This can be achieved by obtaining a smooth gradient characteristic as a whole, while fully utilizing the maximum output density.

In an embodiment, the present invention provides a calibration device that comprises an output value measuring unit, a relative-value correction unit, an absolute-value correction unit, a relative-value calibration unit, an absolute-value calibration unit, and a hybrid calibration unit. The output value measuring unit measures an output value of an image revealing the present input/output characteristic. The relative-value correction unit performs a normalization for the measured output value based on a possible range of the measured output value and a normalization for a desired output value corresponding to the measured output value based on a range of the desired output value. The absolute-value correction unit performs a normalization for the measured output value and the desired output value based on a range of the desired output value. The relative-value calibration unit that calibrates the measured output value normalized by the relative-value correction unit with reference to a characteristic of the desired output value normalized by the relative-value correction unit. The absolute-value calibration unit that calibrates the measured output value normalized by the absolute-value correction unit with reference to the desired output value normalized by the absolute-value correction unit. The hybrid calibration unit that causes the relative-value calibration unit and the absolute-value calibration unit to operate according to a predetermined ratio.

In another embodiment, the present invention provides a calibration method that comprises measuring an output value of an image revealing the present input/output characteristic, performing a relative-value correction by normalization the measured output value based on a possible range of the measured output value and a normalization for a desired output value corresponding to the measured output value based on a range of the desired output value, performing an absolute-value correction by normalization the measured output value and the desired output value based on the range of the desired output value, performing a relative-value calibration by calibrating the measured output value normalized in the relative-value correction step with reference to a characteristic of the desired output value normalized in the relative-value correction step, performing an absolute-value calibration by calibrating the measured output value normalized in the absolute-value correction step with reference to the desired output value normalized in the absolute-value correction step, and performing a hybrid calibration by causing the relative-value calibration step and the absolute-value calibration step to be executed according to a predetermined ratio.

Still another embodiment of the present invention provides a computer-readable recording medium that stores a calibration program. The calibration program causes a computer constituting the image forming device to function as an output value measuring unit, a relative-value correction unit, an absolute-value correction unit, a relative-value calibration unit, an absolute-value calibration unit, and a hybrid calibration unit. The output value measuring unit measures an output value of an image revealing the present input/output characteristic. The relative-value correction unit performs a normalization for the measured output value based on a possible range of the measured output value and a normalization for a desired output value corresponding to the measured output value based on a range of the desired output value. The absolute-value correction unit performs a normalization for the measured output value and the desired output value based on the range of the desired output value. The relative-value calibration unit calibrates the measured output value normalized by the relative-value correction unit with reference to a characteristic of the desired output value normalized by the relative-value correction unit. The absolute-value calibration unit that calibrates the measured output value normalized by the absolute-value correction unit with reference to the desired output value normalized by the absolute-value correction unit. The hybrid calibration unit that causes the relative-value calibration unit and the absolute-value calibration unit to operate according to a predetermined ratio.

Additional features and advantages are described herein, and will be apparent from the following Detailed Description and the figures.

BRIEF DESCRIPTION OF THE DRAWINGS

In the accompanying drawings:

FIG. 1 illustrates an overall configuration of an image forming device according to an embodiment of this invention;

FIG. 2 is a block diagram illustrating an internal configuration of an image processing unit of the image forming device according to the embodiment;

FIG. 3 is a flowchart illustrating operation steps of a calibration process performed for the image forming device according to the embodiment;

FIG. 4 is a graph illustrating a present input/output characteristic (actual curve in solid line) and an input/output characteristic defined by an ideal design target value (ideal curve in broken line) of the image forming device according to the embodiment;

FIG. 5 is a graph illustrating a characteristic of a gamma correction table provided in advance for the image forming device according to the embodiment;

FIG. 6 is a graph illustrating respective input/output characteristics obtained by a normalization of the respective input/output characteristics shown in FIG. 4 by a relative-value correction unit;

FIG. 7 is a graph illustrating respective input/output characteristics obtained by a normalization of the respective input/output characteristics shown in FIG. 4 by an absolute-value correction unit;

FIG. 8 is a graph illustrating how the shape of the present input/output characteristic is approximated to a shape of the desired input/output characteristic while the respective input/output characteristics shown in FIG. 6 are compared;

FIG. 9 is a graph illustrating how the characteristic of the gamma correction table is changed in order to attain the calibration performed for the input/output characteristic shown in FIG. 8;

FIG. 10 is a graph illustrating how the shape of a present output value is approximated to the shape of a desired output value while the respective input/output characteristics shown in FIG. 7 are compared;

FIG. 11 is a graph illustrating how the characteristic of the gamma correction table is changed in order to attain the calibration performed for the input/output characteristic shown in FIG. 10;

FIG. 12 is a graph illustrating the present input/output characteristic, the ideal input/output characteristic, an input/output characteristic after the relative-value calibration, and an input/output characteristic after the absolute-value calibration;

FIG. 13 is a graph illustrating the present input/output characteristic, the ideal input/output characteristic, the input/output characteristic after the relative-value calibration, the input/output characteristic after the absolute-value calibration, and an input/output characteristic after a hybrid calibration;

FIG. 14 is a graph illustrating how a hybrid gamma correction table is generated on the image forming device according to the embodiment; and FIG. 15 sets forth an explanatory diagram for explaining a principle of the gamma correction process.

DETAILED DESCRIPTION

A description will now be given of a preferred embodiment of the present invention with reference to FIGS. 1 to 14.

A calibration device according to an embodiment of the present invention can be achieved by processes, units, and functions executed by a computer pursuant to a program (software). The program transmits instructions to the respective components of the computer, thereby performing the predetermined processes described below, resulting in a realization of the functions of the respective units. In other words, the functions of the respective units and the respective processes of the calibration device and calibration method according to an embodiment of this invention are performed by specific means provided by a cooperation of the program and the computer.

The whole program, or a part thereof, can be contained on, for example, a magnetic disk, an optical disk, a semiconductor memory, and other arbitrary computer-readable recording media. The program that is read from the recording medium is installed and executed by the computer. Alternatively, the program may be loaded on the computer not through the recording medium, but directly via a communication line.

FIG. 1 illustrates an overall configuration of an image forming device according to an embodiment of the calibration device of the present invention.

As illustrated in FIG. 1, the image forming device 100, pursuant to this embodiment, includes a print data acquisition unit 10, an image processing unit 20, a storage unit 30, an engine control unit 40, and an engine unit 50, constituting the calibration device.

The print data acquisition unit 10 acquires print data from a host computer 200, converts the print data into a predetermined format, and outputs the converted print data to the image processing unit 20.

The image processing unit 20 performs image processing for the print data received by the print data acquisition unit 10, and outputs obtained draw data to the engine unit 50, via the engine control unit 40.

In this embodiment, a hybrid calibration process in the image processing unit 20 is performed, thereby performing the image processing which provides a target input/output characteristic.

FIG. 2 is a block diagram illustrating an internal configuration of the image processing unit 20 of the image forming device 100 according to this embodiment.

As illustrated in FIG. 2, the image processing unit 20 includes an output value measuring unit 21, a relative-value correction unit 22, an absolute-value correction unit 23, a relative-value calibration unit 24, an absolute-value calibration unit 25, a hybrid calibration unit 26, and an image processing control unit 27.

The output value measuring unit 21 measures output densities of predetermined patch images or the like. This provides a present input/output characteristic. Specifically, the output value measuring unit 21 measures the densities of the patch images or the like developed by a developing unit 51, and detected by a toner sensor 53.

Data relating to the measured densities are output to the relative-value correction unit 22 and the absolute-value correction unit 23. The relative-value correction unit 22 and the absolute-value correction unit 23 normalize the densities of the patch images measured by the output value measuring unit 21 according to predetermined methods. Specifically, the relative-value correction unit 22 converts the measured density into a value within a certain range based on a possible range of the measured density value, and converts a design target density value corresponding thereto into a value within a certain range, based on a range of the design target density value.

In the image forming device 100 (which performs a process in 8 bits up to 256 gray levels), pursuant to this embodiment, a normalized design target density value DRi' of an arbitrary design target density value DRi, and a normalized measured density value DCi' of an arbitrary measured density value DCi are obtained by:

$$DRi'=((DRi-DR\min)/(DR\max-DR\min))\times 255$$

$$DCi'=((DCi-DC\min)/(DC\max-DC\min))\times 255$$

where: DRmin is the minimum design target density value for an output of 0; DRmax is the maximum design target density value for an output of 255; DCmin is the minimum measured density value for the output of 0; DCmax is the maximum measured density value for the output of 255, and i=0, 1, 2, . . . , 254, 255.

On the other hand, the absolute-value correction unit 23 converts the measured density value and the design target density value corresponding thereto into values within certain range based on the range of the design target density value.

According to this embodiment, a normalized design target density value DRi" of the arbitrary design target density value DRi, and a normalized measured density value DCi" of the arbitrary measured density value DCi are obtained by:

$$DRi''=((DRi-DR\min)/(DR\max-DR\min))\times 255$$

$$DCi''=((DCi-DR\min)/(DR\max-DR\min))\times 255$$

where i=0, 1, 2, . . . , 254, 255.

The relative-value calibration unit 24 performs a process which approximates the respective measured density values normalized by the relative-value correction unit 22 to the design target density value which is similarly normalized. This process is achieved by the predetermined correction table A generated by a correction table generation unit 24-1, according to this embodiment.

Moreover, the absolute-value calibration unit 25 performs a process which approximates the respective measured density values normalized by the absolute-value correction unit 23 to the design target density value which is similarly normalized. This process is achieved by the predetermined correction table B generated by a correction table generation unit 25-1, according to this embodiment.

The hybrid calibration unit 26 blends the relative-value calibration and the absolute-value calibration with each other. The blend is achieved by the hybrid gamma correction table C generated by a hybrid correction table generation unit 26-1. Specifically, the hybrid gamma correction table C is created by blending both the correction table A and the correction table B with each other according to the following equation:

$$\text{Hybrid Gamma Correction Table } C=\text{Correction Table } A\times\alpha+\text{Correction Table } B\times\beta,\text{ where }\alpha+\beta=1.$$

The image processing control unit 27 integrally controls functions of the image processing unit 20, and includes a CPU, a memory, and the like.

The storage unit 30 includes a memory and the like. The storage unit 30 stores the correction table A and the correction table B generated respectively by the correction table generation units 24-1 and 25-1 of the image processing unit 20, and the hybrid gamma correction table C generated by the hybrid correction table generation unit 26-1 of the image processing unit 20.

It should be noted that the data relating to the density values of the print data output from the print data acquisition unit 10 is converted into predetermined density values by referring to the above-mentioned correction tables stored in the storage unit 30. The converted density values are outputted to the engine control unit 40.

The engine control unit 40 outputs the draw data processed by the image processing of the image processing unit 20 to the engine unit 50. This thereby executes the print process.

The engine unit 50 is a device which, when the draw data is inputted from the engine control unit 40, prints an image based on the draw data. The engine unit 50 includes the developing unit 51, a transfer unit 52, and the toner sensor 53.

The developing unit 51 visualizes the draw data to be printed, and, according to this embodiment, performs a developing process of multiple color patch image data items to be measured.

The transfer unit 52 comprises a transfer belt and a transfer drum rotationally driven by drive control of the engine control unit 40, and carries a toner image of a color patch image visualized by the developing unit 51.

The toner sensor 53 is located in the vicinity of the transfer unit 52, in an opposing relationship. The toner sensor 53 reads the toner image formed on the transfer belt and the transfer drum. It should be noted that the toner sensor 53 may read a patch image printed on a print medium such as a paper sheet as well as the image carried by the transfer belt or the like. In this way, the data of the image read by the toner sensor 53 is transmitted to the image processing unit 20 via the engine control unit 40, and the density thereof is measured by the output value measuring unit 21.

Referring to FIG. 3, operation steps of the calibration process of the image forming device 100 according to this embodiment of the present invention will now be described. FIG. 3 is a flowchart setting forth the operation steps of the calibration process of the image forming device 100 according to this embodiment.

First, the developing unit 51 draws the predetermined patch image revealing a present gradient characteristic on a paper sheet, the transfer belt, or the like (S1).

Then, the toner sensor 53 detects the draw data transferred on the transfer belt or the like. The output value measuring unit 21 measures multiple density values of the detected draw data (S2).

As a result, the image processing control unit 27 determines the present density/gray level characteristic (input/output characteristic) of the image forming device 100.

According to this embodiment, it is assumed that the measurement in Step S2 obtains the present input/output characteristic (solid line) illustrated in FIG. 4.

FIG. 4 is a graph illustrating the present input/output characteristic (actual curve in solid line) and an input/output characteristic defined by an ideal design target value (ideal curve in broken line) of the image forming device 100, according to this embodiment.

FIG. 5 is a graph illustrating a characteristic of a gamma correction table provided in advance for the image forming device 100, according to this embodiment.

In order to correct the input/output characteristic unique to the image forming device 100, the image forming device 100 according to this embodiment is provided in advance with the gamma correction table having the characteristic shown in FIG. 5. As a result of an input/output process via the gamma correction table, the present input/output characteristic is presented by the actual curve (solid line) illustrated in FIG. 4. There can be seen a fairly large gap between the actual curve and the ideal curve (broken line).

On this occasion, the image processing control unit 27 analyzes the acquired input/output characteristic, determining whether a value of a solid density is higher or lower than the design target density value (S3).

In Step S3, if the acquired value of the solid density is lower than the design target density value, the relative-value correction unit 22 normalizes the measured density value according to the predetermined method (S4).

In the example illustrated in FIG. 4, according to this embodiment, the actual solid density value is lower than the design target density value, and thus, the calibration process proceeds to Step S4.

In Step S4, the relative-value correction unit 22 normalizes the measured value and the design target density value according to the following equations:

$$DRi'=((DRi-DR\min)/(DR\max-DR\min))\times 255$$

$$DCi'=((DCi-DC\min)/(DC\max-DC\min))\times 255$$

where: DRi is an arbitrary design target density value; DRmin is the minimum design target density value for the output of 0; DRmax is the maximum design target density value for the output of 255; DCi is an arbitrary measured density value corresponding thereto; DCmin is the minimum measured density value for the output of 0; DCmax is the maximum measured density value for the output of 255; DRi' and DCi' are normalized values of DRi and DCi, respectively, and i=0, 1, 2, . . . , 254, 255.

As a result, the respective input/output characteristics illustrated in FIG. 4 are now normalized into the respective input/output characteristics illustrated in FIG. 6.

FIG. 6 is a graph illustrating the respective input/output characteristics (solid line: printer output value, broken line: design target density value) obtained by the normalization of the respective input/output characteristics shown in FIG. 4 by the relative-value correction unit 22.

As illustrated in FIG. 6, while the ideal curve and the actual curve coincide at a start point and an end point, the slopes thereof are different from each other, resulting in recognizable difference in the gradient characteristic.

Then, the relative-value calibration unit 24 generates the predetermined gamma correction table in order to perform a calibration which approximates the shape of the actual curve (solid line) to the shape of the ideal curve (broken line) shown in FIG. 6 (S5).

FIG. 8 is a graph explaining how the shape of the present input/output characteristic is approximated to the shape of the desired input/output characteristic while the respective input/output characteristics illustrated in FIG. 6 are compared. FIG. 9 is a graph explaining how the characteristic of the gamma correction table is changed in order to attain the calibration of the input/output characteristic shown in FIG. 8.

The relative-value calibration unit 24, while considering the shapes of the input/output characteristics, performs a process shifting the characteristic of the present gamma correction table (solid line) to a predetermined position (long and short dashed line) as illustrated in FIG. 9. As illustrated in FIG. 8, providing an improvement (long and short dashed line) to the present input/output characteristic (solid line).

Then, the absolute-value correction unit 23 normalizes the measured value and the design target density value according to the following equations (S6):

$$DRi''=((DRi-DR\min)/(DR\max-DR\min))\times 255$$

$$DCi''=((DCi-DR\min)/(DR\max-DR\min))\times 255$$

where: DRi is an arbitrary design target density value; DRmin is the minimum design target density value for the output of 0; DRmax is the maximum design target density value for the output of 255; DCi is an arbitrary measured density value corresponding thereto; DRi" and DCi" are normalized values of DRi and DCi, respectively, and i=0, 1, 2, . . . , 254, 255.

As a result, the respective input/output characteristics illustrated in FIG. 4 are now normalized into the respective input/output characteristics illustrated in FIG. 7.

FIG. 7 is a graph illustrating the respective input/output characteristics obtained by the normalization of the respective input/output characteristics illustrated in FIG. 4 by the absolute-value correction unit 23. In FIG. 7, a solid line denotes the printer output value after the normalization, and a broken line denotes the design target density value after the normalization.

Then, the absolute-value calibration unit 25 generates the predetermined gamma correction table in order to perform a calibration which approximates the shape of the actual curve (solid line) to the shape of the ideal curve (broken line) in FIG. 7 (S7).

FIG. 10 is a graph explaining how the shape of the present output value is approximated to the shape of the desired output value while the respective input/output characteristics shown in FIG. 7 are compared. FIG. 11 is a graph explaining how the characteristic of the gamma correction table is changed in order to attain the calibration of the input/output characteristic shown in FIG. 10.

It should be noted that, as illustrated in FIG. 7, a density value of from 0 to 30 cannot be provided as an output capability of the present image forming device 100. Thus, the absolute-value calibration unit 25, considering this point, performs a process to shift the characteristic of the present gamma correction table (solid line) to a predetermined position (long and double-short dashed line) as illustrated in FIG. 11, thereby, as shown in FIG. 10, approximating, within the output capability of the image forming device 100, the present density value (solid line) to the ideal value (long and double-short dashed line).

The input/output characteristic improved by correction table A and correction table B, generated respectively in Steps S5 and S7, will now be described with reference to the drawings.

FIG. 12 is a graph illustrating the present input/output characteristic, the ideal input/output characteristic, the input/ output characteristic after the relative-value calibration, and the input/output characteristic after the absolute-value calibration.

As illustrated in FIG. 12, by the relative-value calibration according to correction table A, it is possible to obtain a gray level curve which is largely separated from the target design density value, but has the same shape. This results in a theoretically smooth gray level representation.

On the other hand, as illustrated in FIG. 12, by the absolute-value calibration according to correction table B, it is possible to obtain the gray level curve which coincides with the curve of the design target density value up to the density value which can be output, but the gray level stays in this density value thereafter. This results in a constant gray level representation and thus, a collapse of the image.

Thus, the image processing control unit 27 creates the hybrid gamma correction table C by blending correction table A and correction table B respectively generated in Steps S5 and S7 (S8). Accordingly, an optimal input/output characteristic is obtained with reference to this hybrid gamma correction table C.

Specifically, Table C, which is the hybrid gamma correction table, is obtained by:

$$\text{Table } C(i)=\text{Table } A(i)\times\alpha(i)+\text{Table } B(i)\times\beta(i)$$

where: Table A is the gamma correction table generated in Step S5; Table B is the gamma correction table generated in Step S7; and i=0, 1, . . . , 254, 255, and $\alpha+\beta=1$.

According to this embodiment, as illustrated in FIG. 12, the coefficient $\alpha$ is increased close to one for a low density portion, thereby performing the absolute-value calibration. The coefficient $\beta$ is weighted more for a high density portion, thereby increasing the contribution of the relative-value calibration.

As a result, as illustrated in FIG. 13, the low density portion is calibrated approximately to the design target density value. The high density portion provides an input/output characteristic (dotted line) having a smooth gradient characteristic.

This configuration corresponds to the visual characteristic that human eyes are sensitive to colors that have greater brightness (bright color) and are less sensitive to colors having less brightness (dark color). Thus, this uses a rational calibration method consistent with human vision.

Actually, in the hybrid calibration unit 26, the hybrid correction table generation unit 26-1 generates the hybrid gamma correction table under the condition that the absolute-value calibration is performed up to a certain color value X. When it exceeds the certain color value X, the relative-value calibration is performed in order to obtain a smooth gradient characteristic.

A description will now be provided as to how the hybrid gamma correction table is generated with reference to FIG. 14.

FIG. 14 is a graph setting forth how the hybrid gamma correction table is generated on the image forming device 100 according to this embodiment.

For example, in the image forming device 100 according to this embodiment, as illustrated in FIG. 13 and the like, the maximum correctable input value (output ink quantity) is 180. Accordingly, the absolute-value correction is 150, which is obtained by subtracting 30 from 180. In other words, in the color value range of $0\leqq X\leqq 150$, the hybrid gamma correction table is generated while $\alpha(i)=0$, and $\beta(i)=1$. Moreover, in the color value range of $150<X\leqq 184$, the hybrid gamma correction table is generated while $\alpha(i)=(0.5/34)\times j$ (j=1, 2, . . . , 33, 34), and $\beta(i)=1-\alpha(i)$. Further, in the color value range of $184<X\leqq 255$, the hybrid gamma correction table is generated while $\alpha(i)=\beta(i)=0.5$.

As a result, the hybrid gamma correction table (dotted line) illustrated in FIG. 14 can be generated, and consequently, the input/output characteristic (dotted line) illustrated in FIG. 13 can be realized.

Therefore, in the range of the present output capability, it is possible to perform the calibration utilizing the maximum output density while considering the gradient characteristic.

The value X can be arbitrarily set, may be fixed, or may be changed according to setting. Moreover, without providing the switching point as described above, either of the calibrations may be assigned to the entire hybrid gamma correction table.

When, in Step S3, the solid density value is higher than the design target density value, the absolute-value correction unit 23 normalizes the measured density value data (S9), and the absolute-value calibration unit 25 performs a predetermined calibration based on the normalized respective density values (S10).

This is due to the fact that the present output capability still has a margin in the density value which can be expressed, and the desired input/output characteristic can be provided by controlling the output ink quantity.

As described above, in the image forming device 100 according to this embodiment, the output value measuring unit 21 acquires the present input/output characteristic, and according to the instruction issued by the image processing control unit 27, the relative-value correction unit 22 and the absolute-value correction unit 23 normalize the present and desired density values.

Then, the relative-value calibration unit 24 and the absolute-value calibration unit 25, in order to calibrate the present input/output characteristic, with reference to the normalized density value data, cause the correction table generation units 24-1 and 25-1 to generate the correction table A and the correction table B, respectively.

The hybrid correction table generation unit 26-1 then blends the correction tables A and B with a predetermined ratio into the hybrid gamma correction table C.

In the image forming device 100 according to this embodiment, the hybrid correction table generation unit 26-1 generates the hybrid gamma correction table so that the absolute-value calibration is mainly performed in the gray level portion with a low density value (high brightness). The relative-value calibration is mainly performed in the gray level portion with a high density value (low brightness).

Therefore, when the calibration is performed, the calibration well-balanced between the relative-value calibration and the absolute-value calibration can be performed, thereby maintaining a certain gradient characteristic while fully utilizing the output capability.

Moreover, since it is possible to freely set the weighting ratio between the relative-value calibration and the absolute-value calibration by only changing the coefficients, it is possible to perform a calibration according to various input/output characteristics. In addition, the calibration can efficiently accommodate and utilize the visual characteristic of the human eye.

Moreover, the calibration process described above can be performed through use of a program without drastic modification of hardware or the like.

Thus, in the image forming device 100 according to this embodiment, it is possible to perform a reliable calibration process based on easily implemented methods using a simple device configuration.

Moreover, with the image forming device 100, it is possible to generate a high-quality image output, and to provide exceptional convenience.

The description has been given to a preferred embodiment of the calibration device and the calibration method according to this invention. Of course, the calibration device and the calibration method according to this invention are not limited to the above-mentioned embodiments, and may be changed and modified in various ways within the scope of this invention.

For example, though in the embodiment described above, the calibration device was used, by way of example with an image forming device including a printer device, the calibration device of this invention may be used with a copying machine, a facsimile, a scanner, a digital multifunction device, and the like in addition to the printer device.

Moreover, though the above description relates to a calibration process for the 256 gray levels on the image forming device 100 according to the above-described embodiment, the number of the gray levels is not limited to 256. For example, the calibration process may be easily applied to various image forming devices having $2^n$ gray levels (n-bit process). As a result, it is possible to provide calibration devices having great expandability.

In part, in an embodiment, the invention may be summarized as follows. A calibration device is provided having a correction table for correcting a unique input/output characteristic, and calibrates a present input/output characteristic obtained via the correction table to a desired input/output characteristic. The calibration device comprises an output value measuring unit, a relative-value correction unit, an absolute-value correction unit, a relative-value calibration unit, an absolute-value calibration unit, and a hybrid calibration unit. The output value measuring unit measures an output value of an image revealing the present input/output characteristic. The relative-value correction unit performs a normalization for the measured output value based on a possible range of the measured output value and a normalization for a desired output value corresponding to the measured output value based on a range of the desired output value. The absolute-value correction unit performs a normalization for the measured output value and the desired output value based on the range of the desired output value. The relative-value calibration unit calibrates the measured output value normalized by the relative-value correction unit with reference to a characteristic of the desired output value normalized by the relative-value correction unit, an absolute-value calibration unit that calibrates the measured output value normalized by the absolute-value correction unit with reference to the desired output value normalized by the absolute-value correction unit. The hybrid calibration unit causes the relative-value calibration unit and the absolute-value calibration unit to operate according to a predetermined ratio.

With the calibration device according to this invention configured as described above, first, the present input/output characteristic is acquired by the measurement.

Then, the actual output value acquired by the measurement and the ideal output value are normalized using the predetermined units, and then, can be compared.

The specific normalization units include the relative-value correction unit and the absolute-value correction unit.

The relative-value correction unit converts the present output value into a certain numerical value based on the actual possible range of the output, and converts the ideal output value into a certain numerical value based on the range of the ideal output value.

The absolute-value correction unit converts the present output value and the ideal output value into certain numerical values based on the range of the ideal output value.

Then, after the comparison between the normalized measured values and the normalized ideal values, the relative-value calibration unit and/or the absolute-value calibration unit can be operated to realize a desired input/output characteristic.

According to an aspect of this invention, the relative-value calibration unit and the absolute-value calibration unit are operated in a blended manner according to a predetermined ratio.

As a result, a rational and flexible calibration can be obtained, and it is possible to provide a calibration device which can increase an output quality as well as providing great convenience and reliability.

Moreover, a calibration device according to another aspect of this invention is configured such that the input/output characteristic is a density/gray level characteristic including an input value corresponding to a gray level, and an output value being a density value corresponding to the input value. Here the relative-value correction unit may perform the normalizations by obtaining a normalized density value DRi' corresponding to an arbitrary desired density value DRi according to: $DRi'=((DRi-DRmin)/(DRmax-DRmin))\times N$ where N is the maximum input value, DRmin is the minimum desired density value, and DRmax is the maximum desired density value, and obtaining a normalized density value DCi' corresponding to an arbitrary measured density value DCi according to: $DCi'=((DCi-DCmin)/(DCmax-DCmin))\times N$ where DCmin is the minimum measured density value, and DCmax is the maximum measured density value.

Moreover, the absolute-value correction unit may perform the normalizations by obtaining a normalized density value DRi" corresponding to an arbitrary desired density value DRi according to: $DRi''=((DRi-DRmin)/(DRmax-DRmin))\times N$ where N is the maximum input value, DRmin is the minimum desired density value, and DRmax is the maximum desired density value, and obtaining a normalized density value DCi" corresponding to an arbitrary measured density value DCi according to: $DCi''=((DCi-DRmin)/(DRmax-DRmin))\times N$ where DCmin is the minimum measured density value, and DCmax is the maximum measured density value.

With the calibration device according to above-mentioned aspects of this invention configured as described above, before the calibration process, it is possible to numerically recognize a difference from the ideal characteristic globally or locally.

Therefore, by performing the calibration, which approximates the shape of the curve constructed by multiple DCi's to the shape of the curve constructed by multiple DRi's, it is possible to easily acquire an input/output characteristic having an ideal gradient characteristic.

Moreover, by performing a calibration which approximates the DCi" to the DRi", it is possible to easily acquire an ideal output value (density value) within the output capability.

In other words, the global and/or local correction to the present input/output characteristic can be performed with reference to the specific numerical data, resulting in easy realization of a proper calibration according to the desires of the user.

Moreover, the calibration device according to the another aspect of this invention includes correction table generation units that generate a correction table A for approximating a characteristic of the normalized density value DCi' to a characteristic of the normalized density value DRi', and a correction table B for approximating the normalized density value DCi" to the normalized density value DRi", respectively, and a hybrid correction table generation unit that generates a correction table C by blending the correction table A and the correction table B with each other according to a predetermined ratio, and the hybrid calibration unit is operated by performing an input/output process via the correction table C.

Specifically, the hybrid correction table generation unit obtains correction table C according to: Correction table C=Correction table A×α+Correction Table B×β where α is a blending coefficient for the correction table A, and β is a blending coefficient for the correction table B, where β=1−α.

With the calibration device according to the another aspect of this invention configured as described above, correction table A that provides the relative-value calibration unit and correction table B that provides the absolute-value calibration unit are generated, and then, hybrid correction table C which is a blend thereof is created.

Then, in the input/output process, by referencing hybrid correction table C, it is possible to perform the calibration providing a balance between the smooth gradient characteristic and the reproducibility of the ideal value.

Moreover, since the hybrid correction table can be generated according to the equation, the gradient characteristics for respective input ranges and weighting of the output value can be easily performing by setting the coefficients.

In this way, according to the another aspect of this invention, it is possible to easily obtain flexible calibrations, thereby obtaining an optimal input/output characteristic according to the desires of the user.

Moreover, the calibration device, according to the another aspect of this invention, is configured such that the hybrid calibration unit causes the absolute-value calibration unit to more dominantly operate in a range less than a certain output value, and causes the relative-value calibration unit to more dominantly operate in a range equal to or more than the certain output value.

With the calibration device according to the another aspect of this invention configured as described above, the absolute-value calibration is mainly performed in the gray level having a low density value (high brightness), and the relative-value calibration is mainly performed in the gray level having a high density value (low brightness). This configuration utilizes the visual characteristic that the human eyes are sensitive to, a color having greater brightness (bright color), and are less sensitive to, a color with less brightness (dark color).

Because the calibration can emphasize the gradient characteristics in the gray level portion having a low density value, even if an output value is very different from the ideal output value since the difference is hardly recognized, and in the gray level portion having a high density value, the calibration which approximates an output value to the ideal output value is performed, it is therefore possible to realize an input/output characteristic which is well-balanced as a whole, and is suitable for a human user.

Moreover, a calibration method according to still another aspect of this invention employs a correction table for correcting a unique input/output characteristic, calibrates a present input/output characteristic obtained via the correction table to a desired input/output characteristic. and the calibration method comprises measuring an output value of an image revealing the present input/output characteristic, performing a relative-value correction by normalizing the measured output value based on a possible range of the measured output value and a normalization for a desired output value corresponding to the measured output value based on a range of the desired output value, performing an absolute-value correction by normalizing the measured output value and the desired output value based on the range of the desired output value, performing a relative-value calibration by calibrating the measured output value normalized in the relative-value correction step with reference to a characteristic of the desired output value normalized in the relative-value correction step, performing an absolute-value calibration by calibrating the measured output value normalized in the absolute-value correction step with reference to the desired output value normalized in the absolute-value correction step, and performing a hybrid calibration by causing the relative-value calibration step and the absolute-value calibration step to be executed according to a predetermined ratio.

The present inventions may be embodied and used independently of, or as part of a hardware configuration, and can be provided as a method that provides versatility and expandability.

Moreover, a computer-readable recording medium according to still another aspect of this invention can store a calibration program that, in an image forming device including a correction table for correcting a unique input/output characteristic, calibrates a present input/output characteristic obtained via the correction table to a desired input/output characteristic. The calibration program causes a computer constituting the image forming device to function as an output value measuring unit, a relative-value correction unit, an absolute-value correction unit, a relative-value calibration unit, an absolute-value calibration unit, and a hybrid calibration unit. The output value measuring unit that measures an output value of an image revealing the present input/output characteristic. The relative-value correction unit that performs a normalization for the measured output value based on a possible range of the measured output value and a normalization for a desired output value corresponding to the measured output value based on a range of the desired output value. The absolute-value correction unit that performs a normalization for the measured output value and the desired output value based on the range of the desired output value. The relative-value calibration unit that calibrates the measured output value normalized by the relative-value correction unit with reference to a characteristic of the desired output value normalized by the relative-value correction unit. The absolute-value calibration unit that calibrates the measured output value normalized by the absolute-value correction unit with reference to the desired output value normalized by the absolute-value correction unit. The hybrid calibration unit that causes the relative-value calibration unit and the absolute-value calibration unit to operate according to a predetermined ratio.

In this way, the invention may be embodied as a program as well. As a result, this invention may be embodied by installing the program in a personal computer or the like connected to an image forming device in addition to an image forming device such as a printer, and can be provided as a calibration program having versatility and expandability.

As described above, with the calibration device and the calibration method according to this invention, it is possible to efficiently obtain a desired input/output characteristic by performing the hybrid calibration process according to a present input/output characteristic.

This invention can be preferably utilized for an image forming device and the like provided with a gamma correction table.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A calibration device comprising:

an output value measuring unit that measures an output value of an image representing a present input/output characteristic;

a relative-value correction unit that performs a normalization for the measured output value based on a possible range of the measured output value and a normalization for a design target output value corresponding to the measured output value based on a range of the design target output value;

an absolute-value correction unit that performs a normalization for the measured output value and the design target output value based on the range of the design target output value;

a relative-value calibration unit that calibrates the measured output value normalized by the relative-value correction unit with reference to a characteristic of the design target output value normalized by the relative-value correction unit;

an absolute-value calibration unit that calibrates the measured output value normalized by the absolute-value correction unit with reference to the design target output value normalized by the absolute-value correction unit; and a hybrid calibration unit that causes the relative-value calibration unit and the absolute-value calibration unit to operate according to a predetermined ratio, wherein:

the input/output characteristic is a density/gray level characteristic including an input value corresponding to a gray level, and the output value is a density value corresponding to the input value; and the relative-value correction unit performs the normalizations by:

obtaining a normalized density value DRi' corresponding to a design target density value DRi according to:

$$DRi'=((DRi-DR\min)/(DR\max-DR\min))\times N$$

where N is a maximum input value, DRmin is a minimum design target density value, DRmax is a maximum design target density value, and i=0, 1, 2, . . . , N−1, N; and obtaining a normalized density value DCi' corresponding to a measured density value DCi according to:

$$DCi'=((DCi-DC\min)/(DC\max-DC\min))\times N$$

where DCmin is a minimum measured density value, and DCmax is a maximum measured density value.

2. The calibration device according to claim 1, wherein the absolute-value correction unit performs the normalization by:

obtaining a normalized density value DRi" corresponding to the design target density value DRi according to:

$$DRi'=((DRi-DR\min)/(DR\max-DR\min))\times N$$

where N is the maximum input value, DRmin is the minimum design target density value, DRmax is the maximum design target density value, and i=0, 1, 2, . . . , N−1, N; and obtaining a normalized density value DCi' corresponding to the measured density value DCi according to:

$$DCi'=((DCi-DR\min)/(DR\max-DR\min))\times N.$$

3. The calibration device according to claim 2, comprising:

correction table generation units that generate a correction table A for approximating a characteristic of the normalized density value DCi' to a characteristic of the normalized density value DRi', and a correction table B for approximating the normalized density value DCi" to the normalized density value DRi", respectively; and a hybrid correction table generation unit that generates a correction table C by blending the correction table A and the correction table B with each other according to the predetermined ratio, the hybrid calibration unit is operated by performing an input/output process via the correction table C.

4. A calibration device comprising:

an output value measuring unit that measures an output value of an image representing a present input/output characteristic;

a relative-value correction unit that performs a normalization for the measured output value based on a possible range of the measured output value and a normalization for a design target output value corresponding to the measured output value based on a range of the design target output value;

an absolute-value correction unit that performs a normalization for the measured output value and the design target output value based on the range of the design target output value;

a relative-value calibration unit that calibrates the measured output value normalized by the relative-value correction unit with reference to a characteristic of the design target output value normalized by the relative-value correction unit;

an absolute-value calibration unit that calibrates the measured output value normalized by the absolute-value correction unit with reference to the design target output value normalized by the absolute-value correction unit; and a hybrid calibration unit that causes the relative-value calibration unit and the absolute-value calibration unit to operate according to a predetermined ratio, wherein:

the input/output characteristic is a density/gray level characteristic including an input value corresponding to a gray level, and the output value is a density value corresponding to the input value; and the absolute-value correction unit performs the normalization by:

obtaining a normalized density value DRi" corresponding to the design target density value DRi according to:

$$DRi''=((DRi-DR\min)/(DR\max-DR\min))\times N$$

where N is the maximum input value, DRmin is the minimum design target density value, DRmax is the maximum design target density value, and i=0, 1, 2, . . . , N−1, N; and obtaining a normalized density value DCi" corresponding to the measured density value DCi according to:

$$DCi''=((DCi-DR\min)/(DR\max-DR\min))\times N.$$

5. A calibration method comprising:

measuring, via an output value measuring unit, an output value of an image representing a present input/output characteristic;

performing, via a relative-value correction unit, a relative-value correction by normalizing the measured output value based on a possible range of the measured output value and a normalization for a design target output value corresponding to the measured output value based on a range of the design target output value;

performing, via an absolute-value correction unit, an absolute-value correction by normalizing the measured output value and the design target output value based on the range of the design target output value;

performing, via a relative-value calibration unit, a relative-value calibration by calibrating the measured output value normalized in the relative-value correction step with reference to a characteristic of the design target output value normalized in the relative-value correction step;

performing, via an absolute-value calibration unit, an absolute-value calibration by calibrating the measured output value normalized in the absolute-value correction step with reference to the design target output value normalized in the absolute-value correction step; and performing, via a hybrid calibration unit, a hybrid calibration by causing the relative-value calibration step and the absolute-value calibration step to be executed according to a predetermined ratio, wherein:

the input/output characteristic is a density/gray level characteristic including an input value corresponding to a gray level, and the output value is a density value corresponding to the input value; and the relative-value correction unit performs the normalizations by:

obtaining a normalized density value DRi' corresponding to a design target density value DRi according to:

$$DRi' = ((DRi - DRmin)/(DRmax - DRmin)) \times N$$

where N is a maximum input value, DRmin is a minimum design target density value, DRmax is a maximum design target density value, and i=0, 1, 2, . . . , N−1, N; and obtaining a normalized density value DCi' corresponding to a measured density value DCi according to:

$$DCi' = ((DCi - DCmin)/(DCmax - DCmin)) \times N$$

where DCmin is a minimum measured density value, and DCmax is a maximum measured density value.

6. The calibration method according to claim 5, wherein the absolute-value correction unit performs the normalization by:

obtaining a normalized density value DRi" corresponding to the design target density value DRi according to:

$$DRi'' = ((DRi - DRmin)/(DRmax - DRmin)) \times N$$

where N is the maximum input value, DRmin is the minimum design target density value, DRmax is the maximum design target density value, and i=0, 1, 2, . . . , N−1, N; and obtaining a normalized density value DCi" corresponding to the measured density value DCi according to:

$$DCi'' = ((DCi - DRmin)/(DRmax - DRmin)) \times N.$$

7. The calibration method according to claim 6, comprising:

correction table generation units that generate a correction table A for approximating a characteristic of the normalized density value DCi' to a characteristic of the normalized density value DRi', and a correction table B for approximating the normalized density value DCi" to the normalized density value DRi", respectively; and a hybrid correction table generation unit that generates a correction table C by blending the correction table A and the correction table B with each other according to the predetermined ratio, the hybrid calibration unit is operated by performing an input/output process via the correction table C.

8. A non-transitory computer-readable recording medium that stores a calibration program, the calibration program causing a computer constituting an image forming device to function as:

an output value measuring unit that measures an output value of an image representing the present input/output characteristic;

a relative-value correction unit that performs a normalization for the measured output value based on a possible range of the measured output value and a normalization for a design target output value corresponding to the measured output value based on a range of the design target output value;

an absolute-value correction unit that performs a normalization for the measured output value and the design target output value based on the range of the design target output value;

a relative-value calibration unit that calibrates the measured output value normalized by the relative-value correction unit with reference to a characteristic of the design target output value normalized by the relative-value correction unit;

an absolute-value calibration unit that calibrates the measured output value normalized by the absolute-value correction unit with reference to the design target output value normalized by the absolute-value correction unit; and a hybrid calibration unit that causes the relative-value calibration unit and the absolute-value calibration unit to operate according to a predetermined ratio, wherein:

the input/output characteristic is a density/gray level characteristic including an input value corresponding to a gray level, and the output value is a density value corresponding to the input value; and the relative-value correction unit performs the normalizations by:

obtaining a normalized density value DRi' corresponding to a design target density value DRi according to:

$$DRi' - ((DRi - DRmin)/(DRmax - DRmin)) \times N$$

where N is a maximum input value, DRmin is a minimum design target density value, DRmax is a maximum design target density value, and i=0, 1, 2, . . . , N−1, N; and obtaining a normalized density value DCi' corresponding to a measured density value DCi according to:

$$DCi' = ((DCi - DCmin)/(DCmax - DCmin)) \times N$$

where DCmin is a minimum measured density value, and DCmax is a maximum measured density value.

9. The non-transitory computer-readable recording medium according to claim 8, wherein the absolute-value correction unit performs the normalization by:

obtaining a normalized density value DRi" corresponding to the design target density value DRi according to:

$$DRi'' = ((DRi - DRmin)/(DRmax - DRmin)) \times N$$

where N is the maximum input value, DRmin is the minimum design target density value, DRmax is the maximum design target density value, and i=0, 1, 2, . . . , N−1, N; and obtaining a normalized density value DCi" corresponding to the measured density value DCi according to:

$$DCi'' = ((DCi - DRmin)/(DRmax - DRmin)) \times N.$$

10. The non-transitory computer-readable recording medium according to claim 9, comprising:

correction table generation units that generate a correction table A for approximating a characteristic of the normalized density value DCi' to a characteristic of the normalized density value DRi', and a correction table B for approximating the normalized density value DCi" to the normalized density value DRi", respectively; and a hybrid correction table generation unit that generates a correction table C by blending the correction table A and the correction table B with each other according to the predetermined ratio, the hybrid calibration unit is operated by performing an input/output process via the correction table C.

11. A calibration method comprising:

measuring, via an output value measuring unit, an output value of an image representing a present input/output characteristic;

performing, via a relative-value correction unit, a relative-value correction by normalizing the measured output value based on a possible range of the measured output value and a normalization for a design target output value corresponding to the measured output value based on a range of the design target output value;

performing, via an absolute-value correction unit, an absolute-value correction by normalizing the measured output value and the design target output value based on the range of the design target output value;

performing, via a relative-value calibration unit, a relative-value calibration by calibrating the measured output value normalized in the relative-value correction step with reference to a characteristic of the design target output value normalized in the relative-value correction step;

performing, via an absolute-value calibration unit, an absolute-value calibration by calibrating the measured output value normalized in the absolute-value correction step with reference to the design target output value normalized in the absolute-value correction step; and performing, via a hybrid calibration unit, a hybrid calibration by causing the relative-value calibration step and the absolute-value calibration step to be executed according to a predetermined ratio, wherein:

the input/output characteristic is a density/gray level characteristic including an input value corresponding to a gray level, and the output value is a density value corresponding to the input value; and the absolute-value correction unit performs the normalization by:

obtaining a normalized density value DRi" corresponding to the design target density value DRi according to:

$$DRi''=((DRi-DR\text{min})/(DR\text{max}-DR\text{min}))\times N$$

where N is the maximum input value, DRmin is the minimum design target density value, and DRmax is the maximum design target density value, and i=0, 1, 2, . . . , N−1, N; and obtaining a normalized density value DCi" corresponding to the measured density value DCi according to:

$$DCi''=((DCi-DR\text{min})/(DR\text{max}-DR\text{min}))\times N.$$

12. A non-transitory computer-readable recording medium that stores a calibration program, the calibration program causing a computer constituting an image forming device to function as:

an output value measuring unit that measures an output value of an image representing the present input/output characteristic;

a relative-value correction unit that performs a normalization for the measured output value based on a possible range of the measured output value and a normalization for a design target output value corresponding to the measured output value based on a range of the design target output value;

an absolute-value correction unit that performs a normalization for the measured output value and the design target output value based on the range of the design target output value;

a relative-value calibration unit that calibrates the measured output value normalized by the relative-value correction unit with reference to a characteristic of the design target output value normalized by the relative-value correction unit;

an absolute-value calibration unit that calibrates the measured output value normalized by the absolute-value correction unit with reference to the design target output value normalized by the absolute-value correction unit; and a hybrid calibration unit that causes the relative-value calibration unit and the absolute-value calibration unit to operate according to a predetermined ratio, wherein:

the input/output characteristic is a density/gray level characteristic including an input value corresponding to a gray level, and the output value is a density value corresponding to the input value; and the absolute-value correction unit performs the normalization by:

obtaining a normalized density value DRi" corresponding to the design target density value DRi according to:

$$DRi''=((DRi-DR\text{min})/(DR\text{max}-DR\text{min}))\times N$$

where N is the maximum input value, DRmin is the minimum design target density value, DRmax is the maximum design target density value, and i=0, 1, 2, . . . , N−1, N; and obtaining a normalized density value DCi" corresponding to the measured density value DCi according to:

$$DCi''=((DCi-DR\text{min})/(DR\text{max}-DR\text{min}))\times N.$$

* * * * *